United States Patent [19]

Freyberger

[11] Patent Number: 4,607,288
[45] Date of Patent: Aug. 19, 1986

[54] TELEVISION RECEIVER WITH AN AUTOMATIC DIGITAL ALIGNMENT SYSTEM

[75] Inventor: Laurin C. Freyberger, Bahlingen, Fed. Rep. of Germany

[73] Assignee: ITT Industries, Inc., New York, N.Y.

[21] Appl. No.: 587,403

[22] Filed: Mar. 8, 1984

[30] Foreign Application Priority Data

Mar. 15, 1983 [EP] European Pat. Off. ........ 83102514.3

[51] Int. Cl.$^4$ ............................................. H04N 5/68
[52] U.S. Cl. .................................... 358/242; 358/243; 358/74; 358/10; 315/382; 315/10
[58] Field of Search ..................... 358/242, 243, 21 R, 358/74, 10, 139, 218, 69; 324/404; 315/3, 382, 369, 370, 371, 10

[56] References Cited

U.S. PATENT DOCUMENTS

| | | | |
|---|---|---|---|
| 3,735,388 | 5/1973 | Naka | 315/382 X |
| 4,387,394 | 6/1983 | Powell | 358/10 X |
| 4,439,735 | 3/1984 | Alvite et al. | 358/10 X |
| 4,441,120 | 4/1984 | Gerritsen | 358/139 X |

Primary Examiner—James J. Groody
Assistant Examiner—E. Anne Toth
Attorney, Agent, or Firm—Donald J. Lenkszus

[57] ABSTRACT

In a television receiver, a circuit is provided which automatically controls the focus voltage of the picture tube. The circuit uses a sensor to obtain focusing information from the picture tube wherein this information is processed by an alignment computer and a digital to analog converter which controls a blocking oscillator circuit to provide a focusing voltage.

5 Claims, 1 Drawing Figure

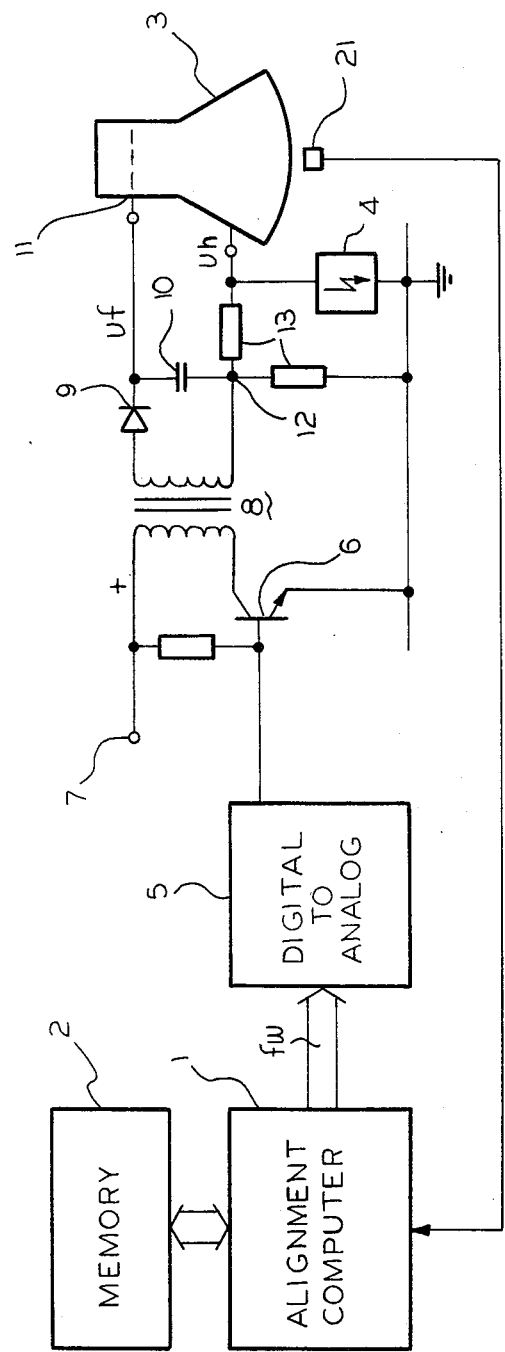

TELEVISION RECEIVER WITH AN AUTOMATIC DIGITAL ALIGNMENT SYSTEM

BACKGROUND OF THE INVENTION

Offenlegungsschrift DE No. 28 05 691 A1 corresponding to U.S. Pat. No. 4,277,797, discloses a color television receiver with an automatic alignment system containing an alignment computer, a reprogrammable nonvolatile memory, and a screen-image-sensor system with which the screen signals are sensed and fed as actual values to the alignment computer. From the actual values and preset nominal values stored in the memory, the alignment computer derives digital correction signals which give the desired setting of screen parameters, particularly in the horizontal and vertical deflection units. This also replaces the functions otherwise performed in the video-signal-processing unit by setting potentiometers, such as white-level, grey-balance, and beam-current-limiting control.

The U.S. Patent cited above does not deal with the replacement of the setting potentiometer for the focusing voltage. In conventional television receivers, this potentiometer is included in a resistor network which derives the focusing voltage from the high voltage generated for the picture tube, cf., for example, a book by O. Limann, "Fernsehtechnik ohne Ballast", 13th Edition, Munich, 1979, pages 275 to 280. The focusing potentiometer, on the one hand, is usually a high-resistance device (of the order of 10MΩ) and, on the other hand, must be capable of withstanding high voltages, because it must deliver a voltage on the order of a few kilovolts.

SUMMARY OF THE INVENTION

An object of the invention is to eliminate the focusing potentiometer in television receivers.

An advantage which follows from the way in which this object is attained is that the complicated and, therefore, costly focusing potentiometer can be dispensed with, which also eliminates the need for the measures necessary for its installation. Another advantage is that focusing, is automated, too, as it is included in the parameters influenced by the alignment computer.

In a television receiver in accordance with the invention, an alignment computer generates digital focusing words in response to nominal focusing information stored in a memory and actual focusing information obtained from a sensor. A converter circuit changes the digital focusing words into pulse duration modulated signals which control a blocking oscillator circuit to provide a focusing voltage.

BRIEF DESCRIPTION OF THE DRAWINGS

The invention will now be explained in more detail with reference to the accompanying drawing, which is a partly schematic circuit diagram of the embodiment.

DETAILED DESCRIPTION

The alignment computer 1 cooperates with the reprogrammable nonvolatile memory 2 in such a way that the above-mentioned nominal alignment data and the data obtained by means of the sensor system 21 and the digital words resulting from the alignment are stored in the memory 2. The sensor system 21 is mounted in front of the screen of the picture tube 3, which is a conventional cathode-ray tube. Such a picture tube requires an anode voltage which is generated by the high-voltage generator 4 and is usually about 20 to 25 kV.

According to the invention, the output of the alignment computer 1 at which the focusing digital word fw appears is connected to the input of the digital-to-analog converter 5, which forms a pulse-duration-modulated signal. This digital-to-analog converter 5 thus converts a digital input word into an analog signal having a constant amplitude and a variable pulse duration. This signal is applied to the control electrode of the switching transistor 6, whose controlled path has one end grounded and the other end connected to the d.c. supply voltage 7 through the primary winding of the blocking oscillator 8. In the embodiment shown in the FIGURE, the emitter of the switching transistor 6 which is a bipolar transistor, is grounded. It is also possible to use other transistor types for the switching transistor, such as field-effect transistors, particularly VMOS transistors.

While the switching transistor 6 is turned on by the pulse-duration-modulated output signal of the digital-to-analog converter da, the primary winding of the blocking oscillator sw is traversed by a current which magnetizes the magnetic core of the oscillator, so that energy is stored. If the current flow in the switching transistor 6 is interrupted, a voltage pulse is developed on the secondary side. This voltage pulse is rectified by means of the rectifier arrangement, consisting of a diode 9 and a capacitor 10 in the embodiment shown in the FIGURE, and applied as the focusing voltage uf to the focusing electrode 11 of the picture tube 3. The blocking oscillator 8 must be so designed that the focusing range of the picture tube 3 can be covered, i.e., that this range corresponds to the setting range of a focusing potentiometer of the known prior art. This range is usually of the order of 1 kV.

The secondary winding of the blocking oscillator 8 is connected via the rectifier arrangement 9, 10 between the focusing electrode 11 of the picture tube 3 and that node 11 of the resistor network 13 whose voltage is equal to the focusing limit voltage assigned to one of the focusing-range limits, the operating value of the focusing voltage uf differing from the focusing limit voltage in the direction of the voltage assigned to the other focusing range limit by the rectified secondary voltage.

In the embodiment shown in the FIGURE, the resistor network 13 is a voltage divider between the anode terminal of the picture tube 3, which is also connected to the high-voltage generator 4, and ground, and the node 12 is the voltage-divider tap assigned to the lower range limit, which makes available approximately 4 to 4.5 kV. Also connected to this tap is the lower end of the secondary winding, whose upper end is connected to the focusing electrode fe through the diode. The capacitor is inserted between the cathode of the diode and the node 12. In the FIGURE, it is assumed that positive voltages are produced; accordingly, the switching transistor 6 is an npn transistor, and the d.c. supply voltage ug is positive. It is obvious that the principle of the invention can also be used if negative focusing voltages and a negative high voltage uh has to be generated.

What is claimed is:

1. Video display apparatus such as a television receiver or the like, comprising:
   a cathode ray tube having a focusing electrode and a high voltage terminal;
   an alignment computer;

a memory coupled to said alignment computer for storing predetermined nominal focusing parameters;

a cathode ray tube screen sensor coupled to said alignment computer;

said alignment computer being responsive to information stored in said memory and to signals provided by said sensor for generating a digital focusing word;

a converter circuit coupled to said alignment computer for forming at an output a pulse-duration modulated signal in response to said digital focusing word;

a high voltage source coupled to said high voltage terminal;

a network coupled to said high voltage source for deriving at a terminal a voltage equal to the focusing limit voltage corresponding to one of two focusing range limits;

a blocking oscillator having a primary winding and a secondary winding;

a rectifier circuit coupled between one end of said secondary winding and said focusing electrode;

the other end of said secondary winding being coupled to said terminal; and a solid state switching means having a control electrode coupled to said converter circuit output, and a controlled path coupled between one end of said primary winding and ground, the other end of said primary winding being coupleable to a d.c. voltage;

whereby the operating value of the focusing voltage at said focusing electrode differs from said focusing limit voltage in the direction of the voltage of the other of said two focusing range limits by the rectified voltage of said secondary winding.

2. Apparatus in accordance with claim 1, wherein said converter is a digital-to-analog converter.

3. Apparatus in accordance with claim 1, wherein said network comprises a resistance voltage divider.

4. Video display apparatus such as a television receiver or the like, comprising:

a cathode ray tube having a focusing electrode and a high voltage terminal;

a high voltage source coupled to said high voltage terminal;

a focusing voltage circuit for providing a focusing voltage to said focusing electrode;

means coupled to said cathode ray tube for obtaining focusing information;

a computer for providing digital focusing words in response to said focusing information;

a converter converting said digital focusing words into pulse-duration modulated signals;

said focusing voltage circuit being responsive to said pulse duration modulated signals for varying said focusing voltage.

5. In a television receiver having a cathode ray tube having a focusing electrode and a high voltage electrode, an automatic digital alignment system comprising:

means coupled to said cathode ray tube for supplying focusing information;

a computer responsive to said focusing information for providing digital focusing words;

a converter converting said digital focusing words into pulse-duration modulated signals; and a focusing voltage circuit for providing a focusing voltage to said focusing electrode, said focusing voltage being varied in accordance with said pulse-duration modulated signals.

* * * * *